(12) United States Patent
Hall et al.

(10) Patent No.: US 6,793,709 B2
(45) Date of Patent: Sep. 21, 2004

(54) DELAMINATION PROCESS

(75) Inventors: John S Hall, Melbourne (AU); Michael Scott McRae-Williams, Ballarat (AU); Kenneth James Heater, Westerville, OH (US); Robert Mark Hodge, Melbourne (AU)

(73) Assignee: METSS.org, LLC, Westerville, OH (US)

( * ) Notice: Subject to any disclaimer, the term of this patent is extended or adjusted under 35 U.S.C. 154(b) by 173 days.

(21) Appl. No.: 10/275,679

(22) PCT Filed: May 11, 2001

(86) PCT No.: PCT/AU01/00538
§ 371 (c)(1),
(2), (4) Date: Nov. 7, 2002

(87) PCT Pub. No.: WO01/85414
PCT Pub. Date: Nov. 15, 2001

(65) Prior Publication Data
US 2003/0131688 A1 Jul. 17, 2003

(30) Foreign Application Priority Data
May 11, 2000 (AU) ............................................. PQ 7471

(51) Int. Cl.$^7$ ................................................. C22B 7/00
(52) U.S. Cl. ............................ 75/403; 134/16; 521/40
(58) Field of Search ............................ 75/403; 134/16; 521/40

(56) References Cited

U.S. PATENT DOCUMENTS

| | | |
|---|---|---|
| 3,070,553 A | 12/1962 | Nagle et al. |
| 3,098,046 A | 7/1963 | Siggel et al. |
| 3,565,852 A | 2/1971 | Conix et al. |
| 3,652,466 A | 3/1972 | Hittel et al. |
| 4,118,346 A | 10/1978 | Summers |
| 4,143,001 A | 3/1979 | Raab et al. |
| 4,212,774 A | 7/1980 | Idel |
| 4,602,046 A | 7/1986 | Buser et al. |
| 5,151,452 A | 9/1992 | Fennhoff et al. |
| 5,214,072 A * | 5/1993 | Fennhoff et al. .............. 521/40 |
| 5,306,349 A | 4/1994 | Nee |
| 5,352,329 A | 10/1994 | Herbert et al. |
| 5,464,877 A | 11/1995 | Franci |
| 5,649,785 A | 7/1997 | Djerf et al. |
| 5,691,290 A | 11/1997 | Vonk et al. |
| 5,817,183 A | 10/1998 | Eddy-Helenek et al. |
| 5,962,383 A | 10/1999 | Doyel et al. |
| 6,060,527 A | 5/2000 | Shinomiya et al. |
| 6,066,229 A | 5/2000 | Komine et al. |
| 6,262,133 B1 | 7/2001 | Wisner |
| 6,335,376 B1 * | 1/2002 | Allen et al. ................. 521/40.5 |
| 6,436,197 B1 | 8/2002 | Sapienza et al. |

FOREIGN PATENT DOCUMENTS

| | | |
|---|---|---|
| DE | 2814908 | 1/1979 |
| DE | 3511711 A1 * | 3/1985 |
| DE | 19955139 A1 * | 11/1999 |
| EP | 0601719 | 6/1994 |
| JP | 09 048025 | 2/1997 |

OTHER PUBLICATIONS

J. Y. Oldohue and N.R. Herbst "A Guide to Fluid Mixing," Basic Concepts, p. 8, 11–21, no date.

* cited by examiner

*Primary Examiner*—Melvyn Andrews
(74) *Attorney, Agent, or Firm*—Hedman & Costigan, P.C.

(57) ABSTRACT

A process for recycling an electronic scrap material comprising a metal provided on a polymeric substrate, which method comprises: milling flaked electronic scrap material with a bead impact material in the presence of water to produce flakes of cleaned polymeric substrate; adding water to the milled material and separating the flakes of cleaned polymeric substrate from metal-containing material; dewatering and drying the flakes of cleaned polymeric substrate; and treating the metal-containing material to recover the metal.

16 Claims, No Drawings

DELAMINATION PROCESS

This application is a 371 of PCT/AU01/00538 filed May 11, 2001.

The present invention relates to a process for recycling electronic scrap material such as optical recording media, for instance CDs and DVDs. In part the process involves delamination of electronic scrap material in order to recover the constituent components of it.

The use of optical recording media such as CDs and DVDs has increased enormously in recent years with applications in the computer and audio/visual entertainment industries. These media typically include a metal, such as aluminium and/or precious metals (typically gold or a mixture containing gold) provided on a polymeric substrate such as a polycarbonate. Typically the metal is provided on the polymeric substrate as a thin metallic film. A protective layer is usually formed on the outer surfaces, and acrylates such as polymethyl (meth)acrylates are commonly used in this respect. These optical recording media have a relatively short life of only a few years as they may become superseded or outdated. This leads to a considerable waste stream. Furthermore, there is a waste stream generated at the time of manufacture due to strict quality control standards: typically up to 20% of manufactured product is rejected. Disposal of such waste is an increasing concern and recycling techniques are being investigated. Similarly other electronic scrap materials including precious metals and plastics are becoming increasingly available, and disposal of them is an important consideration also. In this specification the term "electronic scrap material" is used to embrace all such materials, including optical recording media such as CDs and DVDs.

Known processes for recycling electronic scrap material include smelting and chemical dissolution treatments that are primarily directed at recovering precious metals. Such methods tend to be damaging to any associated plastic material and, furthermore, the disposal of the plastic material can lead to environmental problems. Accordingly, chemical recycling methods tend not to be sympathetic to the environment.

U.S. Pat. No. 5,306,349 assigned to Sony Music Entertainment Inc discloses a method for removing lacquer and aluminium coatings from the polycarbonate substrate of compact discs. This method uses an alkaline solution and the application of ultrasonic energy to compact discs immersed in this solution. Such treatments are not satisfactory when gold is present. Furthermore, the treatment could degrade the polycarbonate plastic.

Recycling methods which rely on physical rather than chemical mechanisms have also been applied. For example, attempts have been made to remove a metallic layer from a polymeric substrate by slicing or shaving techniques. However, with such techniques the throughput can be relatively low and thus uneconomic where a large number of articles are to be recycled. Additionally, for security reasons, manufacturers sometimes choose to cut articles to be recycled (e.g. CDs and, DVDs) into pieces prior to transportation to a recycling facility. Techniques such as slicing and shaving cannot be applied practically to the articles in cut form.

With this background in mind, the present invention seeks to provide a process for recycling an electronic scrap material which does not involve hazardous or potentially harmful chemicals and which is thus environmentally friendly, has high throughput and does not rely on the material to be recycled being in unitary form. The method is easy to perform and economic in practice. Moreover, it has been found that the polymer component it is desired to recover does not significantly degrade during the recycling process so that production of a high grade recycled product may be achieved.

Accordingly, the present invention provides a process for recycling an electronic scrap material comprising a metal provided on a polymeric substrate, which method comprises:

milling flaked electronic scrap material with a bead impact material in the presence of water to produce flakes of cleaned polymeric substrate;

adding water to the milled material and separating the flakes of cleaned polymeric substrate from metal-containing material;

dewatering and drying the flakes of cleaned polymeric substrate; and treating the metal-containing material to recover the metal.

In the present specification the term milling is used to denote any process by which attrition of the surface of the flakes of scrap material by contact with the bead impact material may be achieved. Such attrition removes of surface layer(s) of the scrap material and is a fundamental aspect of the present invention. In the context of the present invention the terms milling and attrition may be used interchangeably in addition to their usual meanings in the particle science industry.

The scrap material to be milled is in flake form. This means that the scrap material, for example a CD or DVD, is cut into individual flakes. This may be achieved using a conventional shredding machine or granulator. Ideally shredding/granulation cuts the material cleanly without any bending or distortion so that the resultant flakes are planar (assuming the original unitary material is planar). Bending or distortion of the scrap material during shredding/granulation can lead to metal smearing of the polymeric substrate material and/or may reduce the efficiency of the subsequent milling operation due to shielding effects.

The scrap material may be cut into flakes at the intended site of recycling or it may be supplied to the site in flake form. Thus, the process of the invention may include as preliminary steps the transportation of electronic scrap material to a flaking station followed by cutting the material into flakes. The flakes may then be transported to a recycling station where subsequent processing is carried out in accordance with the steps of the invention already described. If the scrap material is provided as is to the site where recycling is to take place, flake preparation will obviously be required prior to the subsequent processing. It is envisaged that in practice the scrap material would be supplied to a recycling facility in flake form. Depending on the flake size, further cutting of the flakes may be required prior to processing.

In an embodiment of the invention the flake size prior to milling is usually in the range 1 to 20 mm, for example 1 to 15 mm, preferably 4 to 8 mm and more preferably 4 to 6 mm. The optimum flake size will depend upon such factors as the size of the bead impact material used in the milling step. If the flake size is too small, valuable polymeric material may be lost as fines in downstream process steps.

The flake size has implications with respect to the size of bead impact material used in the milling step. Thus, for relatively large flakes, milling may be optimised using a different size bead impact material when compared with the size of bead impact material most suitable for attrition of smaller flakes.

In a preferred embodiment, the flake size falls within a narrow distribution so that a correspondingly narrow distribution of size of bead impact material may be used in the milling step. For example, it is preferred that at least 50 wt %, for instance at least 75 wt % of flakes have a size of 4–8 mm, and preferably 4–6 mm. It will be appreciated however that a given batch of flakes to be treated may well have a broad distribution of flake size, and to optimise the milling step, bead impact material having a range of particle sizes may be used.

In an embodiment of the invention the flakes to be processed may include a distribution of flake size such that it will be most efficient to mill flakes above a predetermined size with a first size of diameter bead impact material and to mill flakes at or below the predetermined size with a second size diameter of bead impact material. This embodiment of the present invention would thus comprise the following steps:

milling flaked electronic scrap material that is above a predetermined flake size with a first size diameter of bead impact material in the presence of water to produce flakes of cleaned polymeric substrate;

milling flaked electronic scrap material that is at or below the predetermined size with a second size diameter of bead impact material in the presence of water to produce flakes of cleaned polymeric substrate;

adding water to the milled material and separating the flakes of cleaned polymeric substrate from metal-containing material;

dewatering and drying the flakes of cleaned polymeric substrate; and treating the metal-containing material to recover the metal.

In this embodiment, the predetermined size is typically about 3 mm. The first size of bead impact material is usually greater than 1000 $\mu$m and the second size of bead impact material is usually less than 1000 $\mu$m. The first attrition or intensive shear stage generally leads to 80–90% removal of metal from the polymeric substrate.

As a further feature of this embodiment, prior to the first milling step, the process may comprise:

transporting a waste stream of electronic scrap material to a flaking station;

dividing the material into flakes at the flaking station; and transporting the flakes to a milling station.

For the typical flake size contemplated (1 to 20 mm) the milling step may be performed using a bead impact material having a particle size as low as 50 $\mu$m. If the flake, or a significant proportion of the flake (for instance in excess of 50 wt %), has a particle size of 20 mm the particle size of the bead impact material may be as high as 3 mm. The function of the bead material is to remove by attrition the metal, and any additional layer(s) overlying the metal, and one skilled in the art would be able to select a suitable bead impact material size, or distribution thereof, based on this intended function and the following description of other relevant operational parameters.

As bead impact material any material serving the intended function of removing the metal, and any additional layer(s) overlying the metal, may be used. Thus, the bead impact material should have a suitable surface hardness. Interactions between individual flakes may also contribute to the attrition process. For optimum effect it is preferred that the bead impact material is in the form of particles having irregular surfaces. It is also preferred that the bead impact material has a roughened rather than smooth surface. As the milling step takes place in water, the material should also be suitably stable in water. The process of the invention will also typically be carried out at elevated temperature and it follows from this that the bead impact material should also have the necessary integrity at the maximum temperature at which the process is performed.

Examples of bead impact material which may be used include plastics, silicon-containing materials, ceramics and metal powders. Examples include pumice, sand, powdered glass, diatomaceous earth and silicon carbide. Such materials are commercially available. It is also possible to make use of commercially available scouring agents, such as Ajax and Jif, which include abrasive particles in a carrier fluid/paste. It is preferred to use pumice having a particle size of about 300 $\mu$m or less or silica having a particle size of about 150 $\mu$m or less. The use of metals as bead impact material can sometimes lead to discolouration of the polymeric substrate due to smearing. Ceramic materials exhibit excellent abrasive properties although this should be counterbalanced with their tendency to be brittle. In an embodiment of the invention it is possible to use the polymeric material itself, possibly recycled from the process described herein, as the bead impact material. Thus, in CDs and DVDs where the polymeric substrate is s polycarbonate, the bead impact material may be recycled polycarbonate.

In an embodiment of the invention it is preferred that the density of the bead impact material is not too dissimilar ($\pm 50\%$) from that of the polymeric substrate it is desired to recover. The effect of this is that there is enhanced mixing and dispersion of the bead impact material and the flake. If the density of the bead impact material and polymeric substrate is substantially different, partitioning the two may occur resulting in less effective attrition. The size of the bead impact material and the flake may also be matched to enhance mixing and dispersion of the two.

The quantity of bead impact material may vary based on the amount of flake material present, and this will affect the rate of attrition. Thus, where the proportion of bead impact material is high relative to the amount of flake present, the rate of removal of metal, and any overlying layer(s), is correspondingly high. However, the rate of attrition should also be balanced with the rate of wear of the material and/or apparatus that will likely ensue. Typically, the weight ratio of bead impact material to flake is 1:30, for example 1:20. In practice the weight ratio chosen will be influenced by the desired process time which in turn may be influenced by things such as electricity costs.

An important aspect of the invention is that the milling step takes place in the presence of water. The water functions as a lubricant and heat transfer medium as well as aiding transport of the milled products. Without wishing to be limited by the following hypothesis, it is believed that the high intensity attrition due to the bead impact material leads to rapid distortion and heating of the flake at the interface between the various layers present, for example at the metal/polymeric substrate interface, leading to loss of adhesion and delamination. It can also be likened to the cutting of oxidised paint for surfaces with a car polish. Typically, the weight ratio of water to flake is from 1:3 to 3:1 and, preferably, 1:1. If the proportion of water is much in excess of this, the process of the invention works less efficiently.

The process of the invention may be carried out under ambient conditions of temperature and pressure, although it will be appreciated that the milling step will itself cause a temperature increase due to frictional interactions. Typically, for a given process time where lower temperatures are used more bead impact material is required. It is possible to carry out the process at elevated temperature and, in part, this may be achieved by using heated water in the milling step. Indeed, it has been found that elevated temperature either imposed externally, for instance by use of hot water and/or thermal jacketing, or generated in-situ is associated with acceleration of the attrition process. In the case of CDs which have an acrylate outer layer overlying the metal layer, the use of elevated temperature also advantageously lowers the integrity of the acrylate layer thereby facilitating its removal. At elevated temperature it is believed that the acrylate becomes tacky/sticky and this property may lead to enhanced removal of the underlying metal layer when the acrylate layer is itself removed. The process of the invention may therefore be carried out at elevated temperature provided that the polymeric substrate it is desired to recover is not adversely affected. Thus, where the polymeric substrate is a polycarbonate the process may be carried out at a temperature of, for example, up to 120° C. (in which case the process must be carried out under pressure). Where the process is carried out at atmospheric pressure the maximum temperature will be 100° C. In determining the temperature at which the process is carried out the temperature increase due to the milling operation itself must be accounted for.

Milling takes place in any suitable apparatus which is capable of causing high shear between the flakes and bead impact material. Thus, a high shear mixer, a stirred attrition mill, a peg mill mixer or a bead mill may be used. The duration of milling will vary depending upon such factors as the shear imparted by the mixer, the type and proportion of bead impact material, the flake size and the temperature, and may be determined on a case-by-case basis for optimum results.

Prior to milling, it is preferred that the flakes are washed in an aqueous medium containing a detergent or surfactant suitable to remove any particulate and absorbed contaminants from the flake surface.

Subsequent to milling water is added to the flakes of polymeric substrate material. This effectively washes the flakes to remove any products of attrition and the bead impact material. Preferably, the flake is subjected to shear washing with water. Water used in this step may be recycled to the milling step in order to minimise loss of potentially valuable components.

The flakes of washed polymeric substrate are then separated from metal-containing material, and other materials such as derived from any overlying layer(s), using conventional techniques. The separated flakes of polymeric substrate may then be dewatered and dried by conventional techniques. The polymeric substrate is now in a form which may be useful for further applications. Depending upon the grade of the resulting polymer, this may include re-use in an electronic material such as a CD or DVD. Alternatively, the polymeric substrate material may be used in applications where the grade of the material is not as critical.

The metal-containing material is treated to recover the metal. This may be achieved using a thickener, such as a Lamella thickener, which allows the metal solids to settle and flowover water to be removed. A conventional flocculating agent may be used in this step. The metal may then be recovered by filtration techniques such as by use of a pressure filter, drum filter or belt filter. A cake of metal is obtained.

In the case of CDs and DVDs the scrap electronic material includes primarily polycarbonate polymers, aluminium and gold. However, a number of other materials may also be present. These include various adhesives, polymeric materials, lacquers and printing inks. To maximise the value of the polycarbonate polymer it is important and preferred that in its recovered state it is free from contaminants and also that its molecular weight has not been adversely reduced by the recovery process. Any undesirable reduction in molecular weight may be remedial increasing the molecular weight in accordance with conventional techniques. It is less important to have the gold free from other materials as the weight concentration of the gold is relatively low, typically only 100 ppm.

In an embodiment of the invention the process may be used to recover polycarbonate and metal from a CD or DVD. CDs typically have a substrate layer of polycarbonate which is coated on one side with a metal backing layer (usually aluminium). The CD also includes as an outer layer over the metal backing layer an acrylate layer. The present invention may be applied to strip off the layer of acrylate and the layer of metal in order to isolate the polycarbonate. The metal may also be recovered. DVDs may be single-or double-sided. In the double-sided version a layer of metal, typically gold or a gold alloy, is sandwiched between two substrate layers of polycarbonate and acrylate layers may be provided as outer layers on the respective polycarbonate substrate layers. The metal is usually bonded to the polycarbonate layers with an adhesive. In order to access the metal layer it is necessary to delaminate the DVD structure. Cutting the DVD into flakes usually initiates this and subsequent milling will further it. The polycarbonate may be isolated as described using milling/attrition.

As a practical example when recycling a CD or DVD of the type described it is preferred that the CD or DVD is cut into flakes having an even distribution of particle size of about 6 mm. The weight ratio of water:flake used is typically 1:1 and the process temperature about 80° C. As bead impact material silica powder with a maximum particle size of 150 $\mu$m or polycarbonate pellets with a particle size of 1 to 2 mm may be used. In either case the weight ratio of the bead impact material to flake is approximately 1:20.

Although readily applicable to what may be regarded as conventional electronic materials, the invention may be applied to any scrap material in which a metal is provided on a polymeric substrate. For example, the invention may be used to recycle aircraft windows and vehicle headlight reflective backings.

The invention will now be illustrated by the following non-limiting examples. In the examples estimates of sample cleanliness were assessed visually with the aid of an optical magnifier.

EXAMPLE 1

100 of DVD discs were reduced to chipped flakes with maximum dimension of 10 mm in a mechanical flaker. The chips were then chemically cleaned in a washing station to remove surface contaminants. The material was then separated by size to above and below 3 mm using a sieve. The portion less than 3 mm was milled using Ballotini media (glass beads less than 1 mm in diameter) for one hour. The portion greater than 3 mm was milled separately using Ballotini media. The cleaned flakes were then fed into a stirred bead mill, where they were milled for 15 minutes with Ballotini media. Surprisingly, it was estimated that at least 80% of the adhering surface layer had been removed by the action of the beads and the now heated water.

The material from each of these millings was separated on the basis of size into gold rich and polymer rich fractions. The polymer fraction was dewatered and dried to give a high purity compounding grade of polycarbonate.

EXAMPLE 2

0.2 kg of 6 mm flakes of a CD and 0.24 kg of water (heated to 80° C.) were milled using a peg impeller in a 90 mm diameter container surrounded by a 110 mm diameter container as a water jacket. The bead impact medium was 10 g pumice having a maximum particle size of approximately 300 $\mu$m. The impeller was operated at approximately 1500 rpm. Over the course of an hour a temperature rise of 8° C. was observed (the water temperature initially fell to 72° C.). After as little as a quarter of an hour the flakes were estimated to be 99% clean.

EXAMPLE 3

Example 2 was repeated except that the container was 88 mm diameter, the impeller operated at 2095 rpm and the test run for 60 minutes. The temperature of the water after addition to the container was recorded at 35° C. rising to 65° C. after a total of 60 minutes. A sample taken at 30 minutes was estimated to be 97% clean. A sample taken after 60 minutes was estimated to be 99% clean.

EXAMPLE 4

Example 3 was repeated except that the pumice was replaced with 10 g silica having a maximum particle size of 150 μm. After 15 minutes the water temperature was 75° C. rising to 87° C. after a further 15 minutes. Samples were taken at 5 and 30 minutes and were estimated to be between 95 and 97% clean.

EXAMPLE 5

Example 3 was repeated with the water temperature being 72° C. after 5 minutes rising to 95° C. after 15 minutes. A sample taken after 5 minutes was estimated to be 99% clean.

EXAMPLE 6

0.1 kg of 6 mm flakes of a DVD and 0.28 kg of water were milled using a peg impeller in an 83 mm PVC container using 5 g of pumice having a maximum particle size of 300 μm. After 5 minutes the temperature was 35° C. rising to 65° C. after a total of 30 minutes. Samples taken at 15 and 30 minutes were estimated to be at least 96% and at least 98% clean respectively.

As an independent aspect of the present invention it is possible for the flakes of scrap material to function as the bead impact material, i.e. it is not essential to include any extraneous abrasive in order to achieve the desired attrition. The present specification may be understood with this in mind. This is particularly useful when recycling CDs.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in Australia.

What is claimed is:

1. A process for recycling an electronic scrap material comprising a metal provided on a polymeric substrate, which method comprises:

milling flaked electronic scrap material with a bead impact material in the presence of water to produce flakes of cleaned polymeric substrate;

adding water to the milled material and separating the flakes of cleaned polymeric substrate from metal-containing material;

dewatering and drying the flakes of cleaned polymeric substrate; and treating the metal-containing material to recover the metal.

2. A process according to claim 1 wherein the electronic scrap material is a CD or DVD.

3. A process according to claim 1 which is carried out at a temperature from ambient up to 85° C.

4. A process as defined in claim 1 which is carried out at a temperature from ambient up to 120° C.

5. A process according to claim 1 wherein the weight ratio of water to flake is from 1:3 to 3:1.

6. A process according to claim 5 wherein the weight ratio of water to flake is 1:1.

7. A process according to claim 1 wherein the flake size is 1 to 20 mm.

8. A process according to claim 7 wherein the flake size is 4 to 8 mm.

9. A process according to claim 1 wherein the bead impact material is selected from plastics, silicon-containing materials, ceramics and metal powders.

10. A process according to claim 1 wherein the bead impact material is pumice or silica.

11. A process according to claim 10 wherein the pumice has a particle size of 300 μm or less.

12. A process according to claim 10 wherein the silica has a particle size of 150 μm or less.

13. A process according to claim 1 wherein the bead impact material is recycled polymeric substrate.

14. A process for recycling an electronic scrap material comprising a metal provided on a polymeric substrate, which process comprises:

a. milling flaked electronic scrap material that is above a predetermined flake size with a first size diameter of bead impact material in the presence of water to produce flakes of cleaned polymeric substrate;

b. milling flaked electronic scrap material that is at or below a predetermined size with a second size diameter of bead impact material in the presence of water to produce flakes of cleansed polymeric substrate;

c. adding water to the milled material and separating the flakes of cleaned polymeric substrate from metal-containing material;

d. dewatering and drying the flakes of cleaned polymeric substrate; and e. treating the metal-containing material to recover the metal.

15. A process according to claim 14 which comprises, prior to the first milling step:

transporting a waste stream of electronic scrap material to a flaking station;

dividing the material into flakes at the flaking station; and transporting the flakes to a milling station.

16. A process for recycling an electronic scrap material comprising a metal provided on a polymeric substrate, which method comprises:

milling flaked electronic scrap material with a bead impact material in the presence of water to produce flakes of cleaned polymeric substrate;

adding water to the milled material and separating the flakes of cleaned polymeric substrate from metal-containing material;

dewatering and drying the flakes of cleaned polymeric substrate; and treating the metal-containing material to recover the metal, wherein the bead impact material comprises flakes of scrap electronic material.

* * * * *